United States Patent
Kobayashi et al.

(10) Patent No.: US 6,543,208 B1
(45) Date of Patent: Apr. 8, 2003

(54) FOOD-PACKAGING BAG, METHOD OF FOOD PACKAGING, AND USE OF LAMINATED FILM AS FOOD-PACKAGING BAG

(75) Inventors: Yukio Kobayashi, Tokyo (JP); Hirotsugu Mori, Kyoto (JP); Yoshio Iwasaki, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 22 days.

(21) Appl. No.: 09/850,731
(22) PCT Filed: Sep. 11, 2000
(86) PCT No.: PCT/JP00/06210
§ 371 (c)(1), (2), (4) Date: May 9, 2001
(87) PCT Pub. No.: WO01/19694
PCT Pub. Date: Mar. 22, 2001

(30) Foreign Application Priority Data

Sep. 10, 1999 (JP) .................................. 11-256526

(51) Int. Cl.[7] .................................................. B65B 9/06
(52) U.S. Cl. .................... 53/452; 428/483; 428/36.7
(58) Field of Search .................. 53/452, 563; 428/36.7, 428/483

(56) References Cited

U.S. PATENT DOCUMENTS

| | | | | |
|---|---|---|---|---|
| 5,093,194 A | * | 3/1992 | Touhsaent et al. | 428/349 |
| 5,759,337 A | * | 6/1998 | Fujio et al. | 156/356 |
| 5,836,143 A | * | 11/1998 | Yoshida et al. | 198/832 |
| 5,849,374 A | * | 12/1998 | Gruber et al. | 428/34.3 |
| 5,976,653 A | * | 11/1999 | Collette et al. | 428/36.7 |
| 5,985,391 A | * | 11/1999 | Denehy et al. | 428/36.6 |
| 6,063,462 A | * | 5/2000 | Tsukamoto et al. | 428/332 |
| 6,146,726 A | * | 11/2000 | Yoshii et al. | 428/35.9 |
| 6,302,027 B1 | * | 10/2001 | Compton et al. | 102/323 |
| 6,391,407 B1 | * | 5/2002 | Kashiba et al. | 252/188.28 |
| 6,406,644 B2 | * | 6/2002 | Jerdee et al. | 229/100 |
| 6,409,507 B1 | * | 6/2002 | Postal et al. | 433/118 |
| 6,420,004 B1 | * | 7/2002 | Veyrat et al. | 428/141 |

FOREIGN PATENT DOCUMENTS

| | | |
|---|---|---|
| JP | 7206048 A | 8/1995 |
| JP | 8118537 A | 5/1996 |
| JP | 9226843 A | 9/1997 |
| JP | 9267868 A | 10/1997 |
| JP | 11022896 A | 1/1999 |

* cited by examiner

Primary Examiner—Rinaldi I Rada
Assistant Examiner—Gloria R Weeks
(74) Attorney, Agent, or Firm—Shinjyu Global IP Counselors, LLP

(57) ABSTRACT

The present invention provides a bag for packaging food products whose materials can be easily recycled. A bag for packaging food products is formed of a laminated film having a structure of polyester-type sealant layer with a low melting, point/barrier layer (vapor-deposited layer of ceramic or metal)/polyester-type heat resistant layer with a high melting point. The bag is formed by heat sealing the film such that the polyester-type low melting point sealant layer forms an inner side.

20 Claims, 5 Drawing Sheets

FOOD-PACKAGING BAG, METHOD OF FOOD PACKAGING, AND USE OF LAMINATED FILM AS FOOD-PACKAGING BAG

1. Field of the Invention

The present invention relates to a bag for packaging snacks such as potato chips, especially those that require oxygen and/or water vapor barriers. The present invention also relates to a method of packaging food products, as well as a method of using a laminated film for packaging food products in a bag.

2. Description of Related Art

There are various types of structures of packaging materials in conventional bags for packaging snacks (hereinafter referred to as snack bags). Mainly, there are following two types:

(a)
A five-layered structure having, from an inner side, polypropylene resin layer/vapor-deposited metal aluminum layer/biaxially stretched polyethylene terephthalate layer/polyethylene resin layer/biaxially stretched polypropylene resin layer; and (b)
A four-layered structure having, from an inner side, polypropylene resin layer/vapor-deposited metal aluminum layer/polyethylene resin layer/biaxially stretched polypropylene resin layer.

The innermost polypropylene resin (PP) layer functions as a sealant. Polypropylene, especially non-stretched polypropylene resin (CPP) is selected as the innermost layer because the innermost layer has to be able to heat-seal at a low temperature, and also because the innermost layer has to have hot tack properties right after the sealing, and oil repellency properties. The hot tack property is necessary because small pressure is applied to the bag while the bag is being packaged with air or nitrogen being inserted into the bag. The bag is expanded in order to prevent breakage of the snacks, which are contents of the bag. The thickness of this innermost polypropylene resin layer is often set as 20–50 μm.

The vapor-deposited metal aluminum layer functions to shut out external light and prevent permeation of oxygen and water vapor. Its thickness is 300–1500 Å. Normally, the metal aluminum layer is vapor-deposited on the biaxially stretched PET film or polypropylene resin.

The biaxially stretched polyethyleneterephthalate (PET) is a material on which metal aluminum can be vapor-deposited most stably. PET having a thickness of 12 μm is frequently utilized.

The polyethylene resin (PE) layer functions as an adhesive by attaching the biaxially stretched PET film and the outermost biaxially stretched polypropylene (OPP) film, or by attaching the innermost non-stretched polypropylene resin layer and the biaxially stretched PET film. Its thickness is about 15 μm. Ethylene(meta)acrylic acid copolymer is sometimes utilized as a polyethylene resin layer. Additionally, urethane-type adhesive or adhesives that include monomer but do not include organic solvent may be used instead of a polyethylene resin layer.

The outermost biaxially stretched polypropylene layer such as biaxially stretched polypropylene film directly contacts the heated heat seal member (seal bar), and thereby transmits the heat to the innermost polypropylene resin layer. Its thickness is 15–25 μm.

The packaging material having the above-described 4–5 layered structures has the total thickness of 40–117 μm.

As a manufacturing method of the packaging material having the above-described structure, a manufacturing method such as OPP film/PE extrusion laminate/PET film/vapor-deposited metal aluminum layer/PP extrusion laminate is often utilized from a cost point of view.

However, in such packaging material structure, since different resins including polypropylene resin, PET resin, and polyethylene resin are combined, material recycling is extremely difficult. Additionally, since polypropylene resin is the innermost layer, the flavor of the snack tends to be adsorbed. Accordingly, the taste of the snack is weakened. Furthermore, since the total thickness is about 60–120 μm, it is difficult to transmit the heat. Furthermore, a pinhole is often created at a fin-sealed portion in the pillow packaging. (See FIGS. 4 and 5.)

BRIEF SUMMARY OF THE INVENTION

The object of the present invention is to provide a bag for packaging food products whose materials can be easily recycled while avoiding the above-described problems.

A bag for packaging food products in accordance with the present invention is formed of a laminated film having a structure of polyester-type sealant layer with a low melting point/barrier layer having barrier properties against oxygen and water vapor/polyester-type heat-resistant layer with a high melting point. The bag is formed by heat sealing such that the polyester-type low melting point sealant layer forms an inner side.

Here, the polyester-type low melting point sealant layer is disposed as the innermost layer of the bag. Preferably, this sealant layer should have a low melting point (the melting point being below 160° C.), to be used by the high-speed properties of the packaging machine. It is possible to obtain various polyester-type resins having various melting points because various polymers in polyester-type resins can be obtained by combining different monomers, in other words, diols and dicarboxylic acids.

Among monomers of polyester-type resins having low melting point, terephthalic acid is well suited among the dicarboxylic acids from the cost point of view. Among diols, 1,3 butanediol (a polyester resin having a melting point of about 80° C. and can be obtained by condensing with terephthalic acid) or 1,2-propylene glycol (a polyester resin having a melting point of about 122° C. can be obtained by condensing with terephthalic acid) is preferable. Furthermore, amorphous copolymer PET with amorphous cyclohexane dimethanol (for instance, PETG, a product of U.S. Eastman Chemical Company) is also preferable because low-temperature heat sealing can be conducted. Furthermore, polybutylene succinate, polyethylene succinate, and polybutylene succinate adipate copolymer (these are publicly sold as biodegradable resin BIONOLLE) that are obtained by using succinic acid and/or adipic acid such as dicarboxylic acid, 1,4-butanediol or ethylene glycol such as diol can also be used as polyester for a low melting point sealant layer. These resins can be heat-sealed at a low temperature. Additionally, since these resins are polyester resins, the resins do not absorb the flavor of the contents, such as snacks, of the bag. The thickness is preferably 15–50 μm.

Preferably, the innermost polyester-type low melting point sealant layer should be a non-oriented resin layer that has been formed without being stretched. Generally, stretching of the plastic is performed at a temperature that is 10–20° C. below the melting point with heat-setting while the plastic is stretched along two axes that extend in longitudinal and latitudinal directions. The stretched film trebles its rigidity, transparency, and capacity as an $O_2$ barrier. These properties are maintained up to the heat setting temperature. However, once the temperature rises beyond this heat-setting temperature, a disorder occurs in the molecular orientation. Accordingly, the effects of the biaxial stretching are lost, and the film shrinks. In that case, the heat-sealed portion becomes wrinkled at the time of heat sealing, or heat sealing cannot be conducted in a satisfactory manner. Therefore, the innermost polyester-type low melting point sealant layer should preferably be an effectively non-oriented resin layer which is formed without being stretched.

It is also preferable to form the polyester-type low melting point sealant layer as a laminate having a low melting point polyester resin and a high melting point polyester resin. In this case, the thickness of the low melting point polyester resin should be 5–25 μm, the thickness of the high melting point polyester resin should be 10–45 μm, and the thickness of the polyester-type low melting point sealant layer should be 15–50 μm. The polyester of the high melting point polyester resin of the polyester-type low melting point sealant layer may be the same as or different from the polyester of the low melting point polyester resin of the polyester-type low melting point sealant layer. The polyester of the high melting point polyester resin of the polyester-type low melting point sealant layer may be formed using polyesters collected from PET bottles, PET trays, or other PET containers. It is even more preferable if the collected polyesters are utilized after they are improved to increase properties such as the melting viscosity.

The barrier layer having the oxygen and water vapor barrier property can be a vapor-deposited ceramic or metal layer.

As the vapor-deposited ceramic or metal layer, the layer that is pre-vapor-deposited on the outer side of the polyester-type high melting point heat resistant layer can be utilized. Additionally, when the polyester-type low melting point sealant layer is a laminate of a low melting point polyester resin and a high melting point polyester resin, the vapor-deposited ceramic or metal layer can be vapor-deposited on the high melting point polyester resin first, and thereafter the polyester-type low melting point sealant layer and the polyester-type high melting point heat resistant layer can be laminated.

When the passage of light needs to be shut off, materials such as metal aluminum (Al) is vapor-deposited, thereby forming a vapor-deposited metal layer.

The thickness of the vapor-deposited ceramic or metal layer should be 300–1500 Å. In the case of transparent bags that show contents of the bags, single element vapor-deposited layer with $SO_x$ or $Al_2O_3$, or two-element vapor-deposited layer with $SiO_x/Al_2O_3$, $SiO_x/ZnO$, $SiO_x/CaO$, $SiO_x/B_2O_3$, $CaO/Ca(OH)_2$ are utilized. The thickness should be 300–1500 Å. Since these vapor-deposited ceramic or metal layers are very thin, it will not be an obstacle at the time of material recycling. Examples of $SiO_x$ include $SiO_2$.

As the monomers of the polyester-type high melting point resin, terephthalic acid is suited among dicarboxylic acids, and ethylene glycol is suited among diols, respectively. PET resin (polyethylene terephthalate) can be obtained with this combination. PET resin is most preferable for use in the present invention from the point of view of cost and heat resistance. As the PET resin, a biaxially stretched film is best suited with regards to the need for tensile strength, penetration strength, heat resistance and rigidity, and also due to the suitability of ceramic for vapor deposition. The thickness should be 8–20 μm.

Preferably, the melting point of the polyester-type high melting point heat resistant layer should be higher than 220° C. When the maximum melting point of the polyester-type low melting point sealant layer is 160° C., the temperature of the actual heat seal bar will be at least 180–200° C., which is higher than 160° C. It is preferable that the melting point of the polyester-type high melting point heat resistant layer is higher than 220° C., such that the effects of the biaxial stretching will not be lost due to the seal bar temperature. In other words, since the seal bar temperature is about 180–200° C., the heat setting temperature of the biaxial stretching of the polyester-type high melting point heat resistant layer should be higher than 200° C. Since the melting point is 10–20° C. higher than the heat setting temperature, the melting point should be preferably higher than 220° C.

In this manner, by structuring the packaging material as polyester-type low melting point sealant layer (15–50 μm)/vapor-deposited ceramic or metal layer (300–1500 Å)/polyester-type high melting point heat resistant layer (8–20 μm), a combination of identical polyester-type materials is utilized. Therefore, material recycling can be conducted easily. In other words, the bags for packaging food products in accordance with the present invention can be reused as polyester by melting after being collected.

When conventional bags having polyolefin-type resin layer are burned, (thermal recycle) the calorific power amounts to 9000–11000 Kcal/Kg. Therefore, it is possible that the combustion furnace may be damaged. However, bags of the present invention do not have polyolefin layer, and are effectively formed by polyester. Therefore, the calorific power is only 4500–5000 Kcal/Kg. In this manner, the bags of the present invention are effective in reducing the calorific power.

Furthermore, the inner surface that contacts the snacks, which are the contents of the bags, is made of polyester-type resin. Thus, the flavor of the snacks will not be adsorbed.

Since the total thickness is as thin as 23–70 μm, creation of pinhole at the back seal in the pillow packaging can be prevented. For instance, as seen in FIG. 4, fin seal of pillow packaging is first performed on a bag seal portion that corresponds to the fin. Then, side sealing is performed. At this time, a pinhole is often created at a corner portion between the joining portion of the back seal and the joining portion of the side seal (See FIG. 5). However, with the structure of the present invention, it is possible to close the pinhole by melting the sealant. Whether or not the pinhole is created has to do with the thickness of the sealant layer and the total thickness. More specifically, if the sealant layer is thicker than 15 μm, and if the ratio of the sealant's thickness to the total thickness is greater than 0.30, it is confirmed that a pinhole is not created.

Furthermore, in pillow packaging, even when a wrap seal that seals the back seal portion formed by joining ends on both sides is utilized, it is possible to close a gap that may be formed at a joining portion between the end portion of the overlapping portion of the back seal and the side seal portion by utilizing the present invention.

Regarding printing that adds to marketability, when the vapor-deposited layer is of transparent material such as $SiO_x, Al_2O_3$, $SiO_x/ZnO$, $SiO_x/CaO$, $SiO_x/B_2O_3$, $CaO/Ca(OH)_2$, it is preferable, from the point of view of printing aesthetics, to take a back side printing method, by which printing is performed on the surface of the vapor-deposited layer, thereby forming polyester-type low melting point sealant layer/ink/vapor-deposited ceramic layer/polyester-type high melting point heat resistant layer. On the other hand, if the ink will be an obstacle at the time of material recycling, it is desirable to take a front printing method, by which printing is performed on the surface of the polyester-type high melting point heat resistant layer, thereby forming polyester-type low melting point sealant layer/vapor-deposited ceramic or metal layer/polyester-type high melting point heat resistant layer/ink. In the case of the front printing method, it is possible to prevent the obstruction in the material recycling by the ink by utilizing an ink that can be washed off during a recycling process (dip soldering process in 2% NaOH solution at 85° C. for 30 minutes), more specifically inks such as DAIECORO, a product of Dainichiseika Color & Chemicals Mfg. Co., Ltd. Furthermore, when the vapor-deposited layer is a vapor-deposited metal aluminum layer that is opaque, it is preferable to take the front printing method.

(Best Mode To Carry Out The Invention)

DESCRIPTION OF THE PREFERRED EMBODIMENT

Printing was performed on a vapor-deposited $SiO_x$ surface of MOS-TO, a product of Oike Industrial Co., Ltd., which is a 12 $\mu$m PET film with vapor-deposited $SiO_x$. The film was attached to a PETG film, a product of U.S. Eastman Chemical Company, which is a 30 $\mu$m polyester-type low-temperature heat seal film, using a dry laminate method with a conventional polyester-type adhesive (TM-250, a product of Toyo Morton Co., Ltd.). In this manner, a film roll of snack bags was created.

Figure 1:
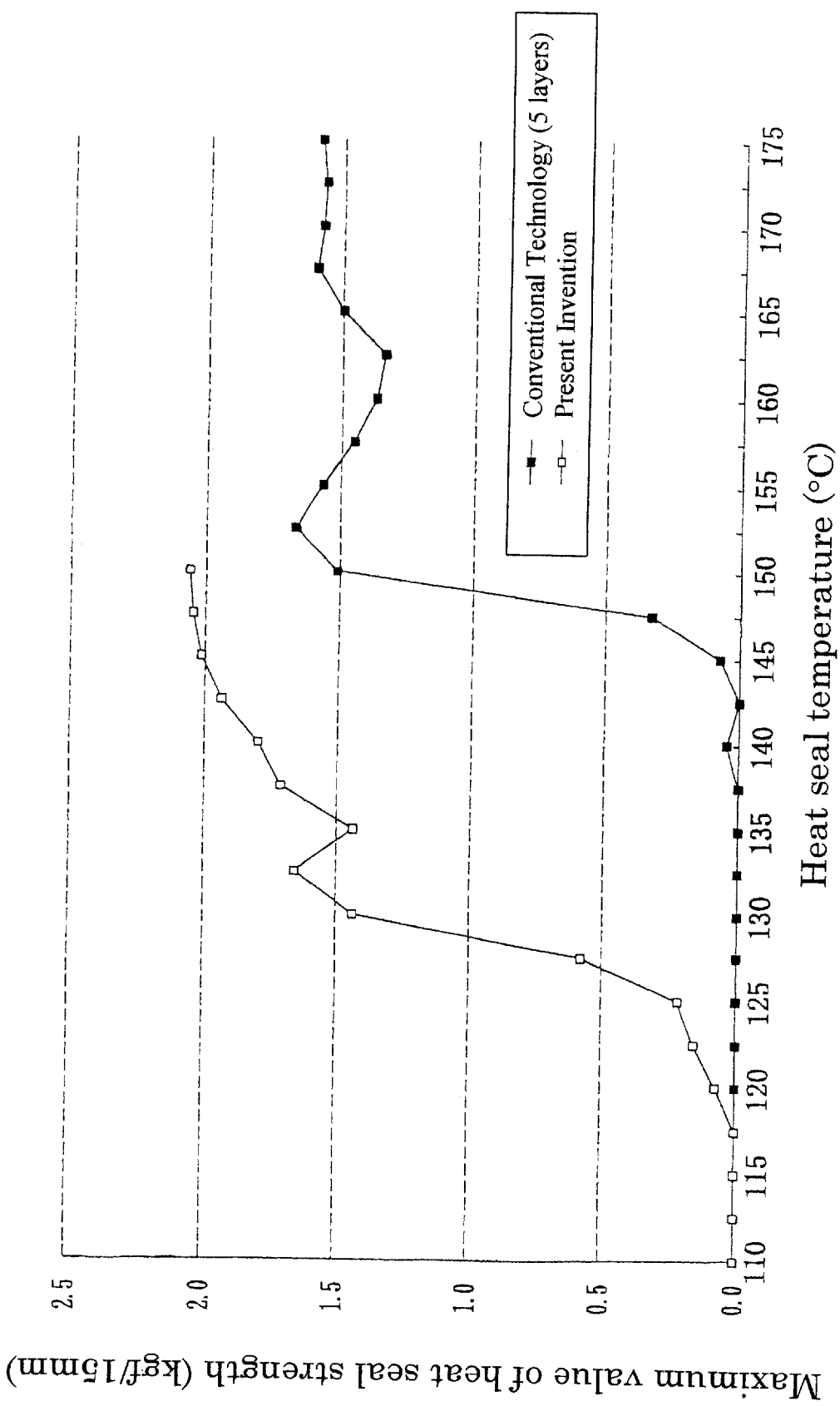
FIG. 1 is a view of heat seal temperature properties of film rolls for snack bags in accordance with conventional technology (Conventional technology) and the first embodiment of the present invention (Present invention).

The heat seal temperature property, $O_2$ penetration rate, and $H_2O$ penetration rate were measured and compared with respect to this film roll and a conventional film roll having a structure of OPP (18 $\mu$m)/PE (17 $\mu$m)/PET (12 $\mu$m)/vapor-deposited Al (500 Å)/PP (30 $\mu$m). The results are shown in FIG. 1 and Table 1.

TABLE 1

| Film roll∴Items | $O_2$ penetration rate ml/m² · D · atm | $H_2O$ penetration rate g/m² · D |
|---|---|---|
| Present invention | 0.5 | 0.2 |
| Conventional | 2.0 | 0.5 |

Next, a test with actual equipment was carried out using an actual snack packaging machine (APEX PACKAGING MACHINE, a product of Ishida Co., Ltd.) with respect to these film rolls. The results are shown in Table 2.

TABLE 2

| Film roll∴Items | Seal bar set temperature | Packaging speed |
|---|---|---|
| Present invention | 95° C. | 120 BPM |
| Conventional | 170° C. | 75 BPM |

As clearly seen from FIG. 1, the heat seal temperature of the present invention film started around 100° C. Therefore, the present invention film was heat-sealed at a temperature that is 50–70° C. lower than the temperature in the case of the conventional film. Consequently, as seen in Table 2, the present invention film was packaged at a speed 1.6 times faster than that of conventional film. In other words, while only 75 bags could be packaged in one minute from the conventional film, 120 bags could be packaged in one minute from the film of the present invention.

Figure 4:
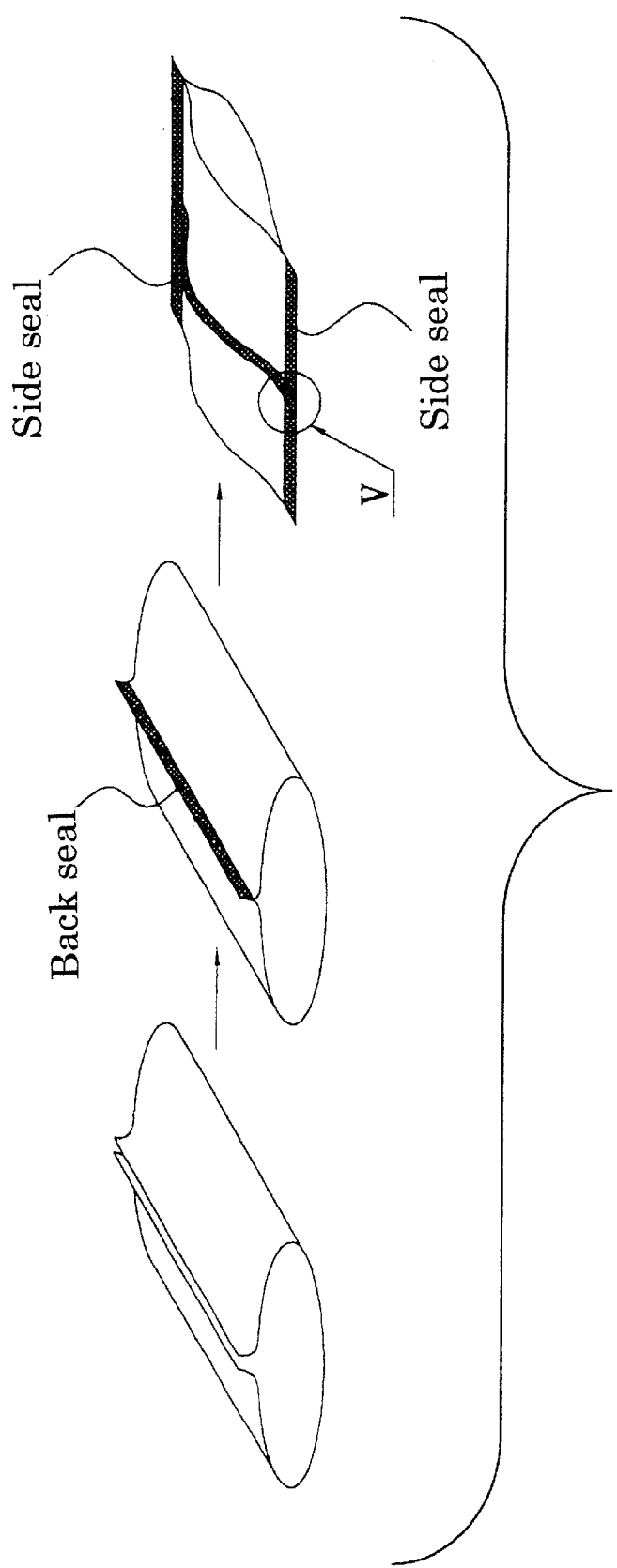
FIG. 4 is an explanatory view of the fin seal of pillow packaging.
Figure 5:
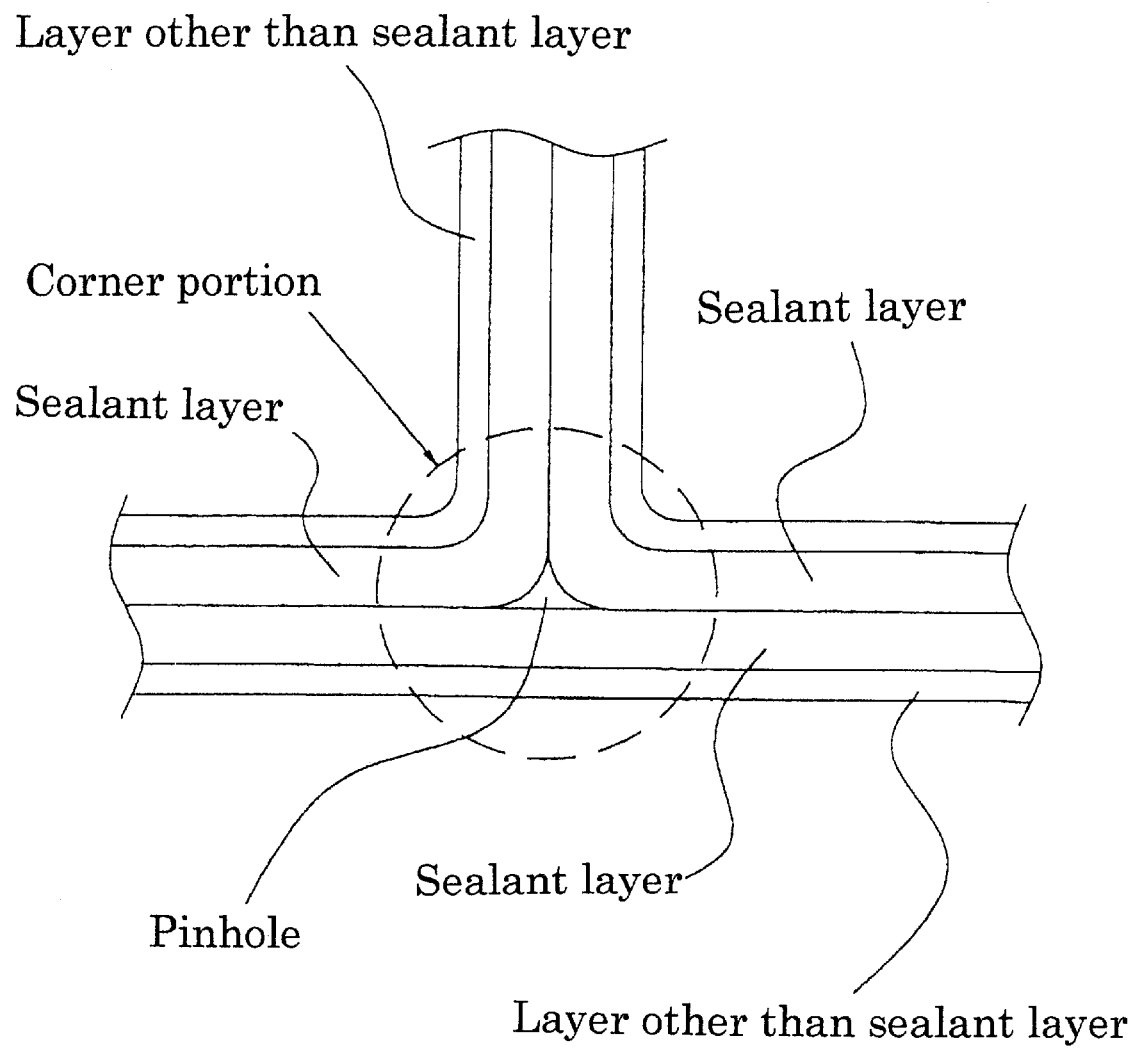
FIG. 5 is an expanded cross sectional view of V portion of FIG. 4.

In the snack packaging machine, as shown in FIG. 4, the packaging film was formed into a tubular shape such that the 30 $\mu$m film, the product called PETG (polyester-type low melting point sealant layer), forms the inner side. Then, the overlapping back portions were heat-sealed (back sealed). Next, snacks were inserted into the inner portion of the tubular snack bags. Then, both ends of the tubular snack bags were heat-sealed (side sealed). In this manner, snacks were packaged in the snack bags.

The above-described APEX PACKAGING MACHINE, a product of Ishida Co., Ltd., is disclosed in U.S. Pat. No. 5,347,795 (Assignee: Ishida Co., Ltd.). The disclosure of the aforesaid patent specification hereby constitutes a part of this specification.

SECOND EMBODIMENT

Printing was performed on a vapor-deposited $Al_2O_3$ surface of BARRIALOX HGC, a product of Toyo Metallizing, Co., Ltd., which is a 12 $\mu$m PET film with vapor-deposited $Al_2O_3$. The film was attached to a PETG film, a product of U.S. Eastman Chemical, Co., which is a 30 $\mu$m polyester-type low-temperature heat seal film, using the dry laminate method with a conventional polyester-type adhesive used in the first embodiment. In this manner, a film roll for snack bags was created. Then, heat seal temperature property, $O_2$ penetration rate, and $H_2O$ penetration rate of this film roll were measured. The results are shown in FIG. 2 and Table 3.

TABLE 3

| Film roll∴Items | $O_2$ penetration rate ml/m² · D · atm | $H_2O$ penetration rate g/m² · D |
|---|---|---|
| Present invention | 1.8 | 2.0 |

Figure 2:
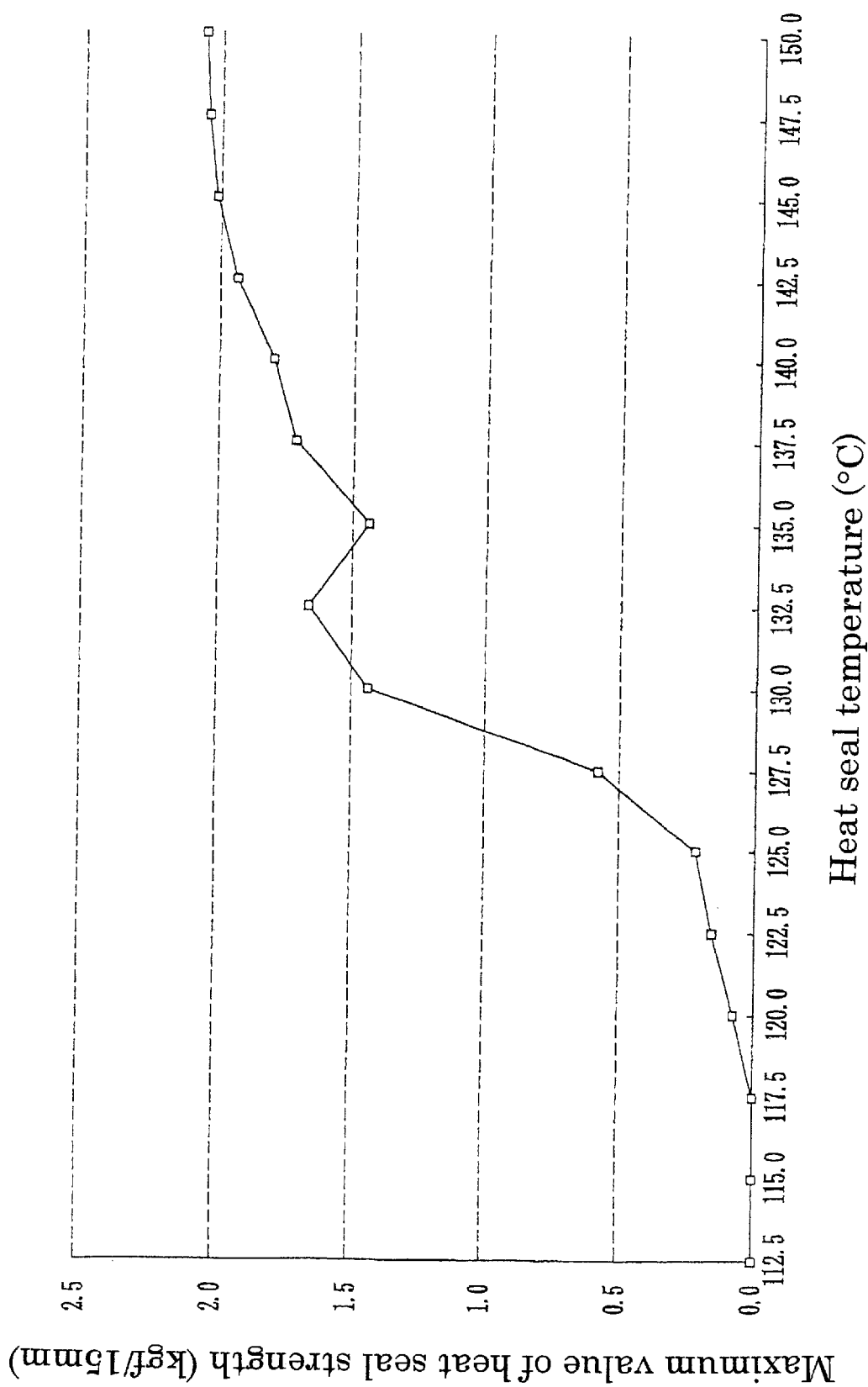
FIG. 2 is a view of heat seal temperature properties of film rolls for snack bags in accordance with the second embodiment of the present invention (Present invention).
Figure 3:
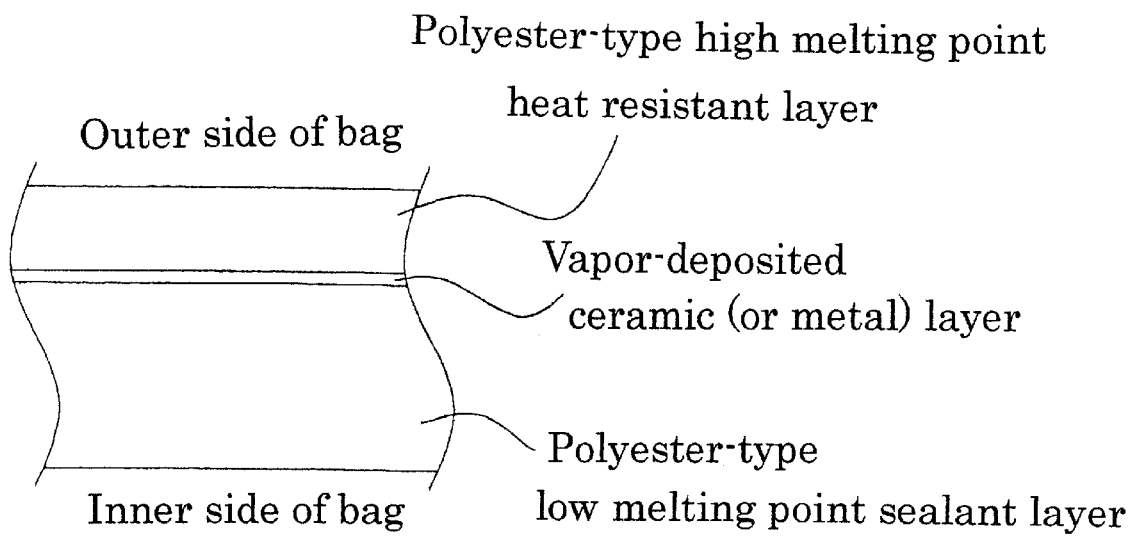
FIG. 3 is a structural view of the laminate of the film roll for snack bags in accordance with the present invention.

The heat seal property shown in FIG. 2 shows substantially identical curve as the heat seal property of the first embodiment shown in FIG. 1, since the material structure is the same as the first embodiment. Additionally, the total thickness and the sealant's thickness are identical. Therefore, it can be presumed that the packaging speed with the actual packaging device will be the same as the speed in the first embodiment.

THIRD EMBODIMENT

Printing was performed on a PET surface of TETO-LIGHT JC, a product of Oike Industrial Co., Ltd., which is a 12 $\mu$m PET film with vapor-deposited metal Al, using an ink (DAIECORO, a product of Dainichiseika Color & Chemicals Mfg. Co., Ltd.) that peels off during a material recycling process of PET. The metal Al vapor-deposited surface of the film was attached to a 30 µm polyester-type low-temperature heat seal film manufactured by U.S. Eastman Chemical Company. (the product called PETG), using the dry laminate method with the same conventional polyester-type adhesive as in the first embodiment. In this manner, a film roll for snack bags was created.

A piece of the film roll was dipped and soldered in 2% NaOH solution at 85° C. for 30 minutes, in the same manner as in the material recycling process of PET. It was confirmed that the printed ink totally peels off.

FOURTH EMBODIMENT

A test of filling and packaging snacks (potato chips) that were just made was conducted with respect to the film roll of the first embodiment and the conventional film roll. The packaging machine utilized was an APEX PACKAGING MACHINE manufactured by Ishida Co., Ltd. $N_2$ conversion was also conducted. The APEX PACKAGING MACHINE is the one disclosed in U.S. Pat. No. 5,347,795.

The packaged bags thus obtained were placed in a constant temperature bath. Then, after conducting "40° C.-1 month storing test", a sensory test was performed by 10 panelists. The results are shown in Table 4.

TABLE 4

| Film roll ∴ Items | Flavor at the time of opening the bag | Taste and flavor |
| --- | --- | --- |
| Present invention | 4.6 | 4.8 |
| Conventional | 3.5 | 4.3 |

Note 1) The evaluation utilized 5-level evaluation. Point 5.0 indicates the flavor right after the snack is made. Point 3.0 is the edible threshold point. The point above 3.0 was considered as marketable.

2) The flavor at the time of opening the bag was evaluated by the flavor at the time of opening the bag. The taste and flavor was evaluated by the taste of the potato chips upon eating the potato chips.

As clearly seen from Table 4, the film of the present invention offers better flavor at the time of opening the bag and better flavor upon eating the potato chips. This indicates that the result of using as the innermost layer the polyester-type sealant is that it absorbs little flavor.

FIFTH EMBODIMENT

First, recycled PET resin was provided by increasing the inherent viscosity of the PET resin of recycled products. Then, a sealant film was made by co-extrusion molding of the recycled PET resin and PETG resin, a product of Eastman Chemical, Co. This two-layered sealant film was adhesively attached to a film, which was BARRIALOX HGC, a product of Toyo Metallizing Co., Ltd., with printing performed on its $Al_2O_3$ vapor-deposited surface. BARRIALOX HGC is a 12 µm PET film with vapor-deposited $Al_2O_3$. This adhesion utilized the same conventional polyester-type adhesive as in the first embodiment. In this manner, a film roll for snack bags was created. When the sealant film was adhesively attached to the film that is BARRIALOX HGC with the printing on its $Al_2O_3$ surface, the dry laminate method was utilized, such that the PETG side forms the innermost layer.

As the recycled resin layer used in the sealant film formed by co-extrusion molding, straight chain saturated polyester (for instance, polyethylene terephthalate, polybutylene terephthalate, polyethylene-2, 6-naphthalene dicarboxylate) was utilized to use collected materials that have been used as various products such as textile, film, and bottles. Since such resin was cheaper than virgin resin, it was utilized in 80–90% of the sealant layer. Since the innermost layer was a surface that contacts the food products, virgin PETG was used as the sealant. The total thickness of the sealant layer was 30 µm. The thickness of the innermost PETG was 5 µm.

Although a two-layered sealant film was utilized in this embodiment, it is also possible to form a three-layered structure by providing PETG resin layers on both surfaces of the recycled PET resin. Furthermore, it is possible to utilize polybutylene succinate resin instead of PETG.

Furthermore, although the thickness of the sealant layer was 30 µm in this embodiment, the thickness can be varied within the range of 20–60 µm. The thickness of the innermost layer can be varied within the range of 5–20 µm.

In this manner, use of recycled product as a part of the sealant material provides a cost advantage.

SIXTH EMBODIMENT

A vapor-deposited aluminum layer was formed on the recycled PET resin side of the two-layer sealant film of the fifth embodiment. Since there was a high melting point polyester resin layer, it was possible to limit the stretching of the film due to the heat from the vapor-depositing device. Accordingly, it was possible to obtain a stable densely-deposited vapor-deposited layer.

The polyester sealant layer obtained in the manner described above had a vapor-deposited aluminum layer and was given a gas barrier property. To this polyester sealant layer, a high melting point biaxially stretched PET film was adhered using the dry laminate method with the same polyester adhesive as in the first embodiment. (The high melting point biaxially stretched PET film has a printed surface on a surface opposite the surface to be laminated. The printing was performed using the ink disclosed in the third embodiment.) In this manner, the packaging material was obtained. The obtained packaging material could be material-recycled. Additionally, since the packaging material did not include polyolefin-type resin, the packaging material was advantageous for burning purpose.

In the above description, it is possible to use $SiO_2$ or $Al_2O_3$ as the vapor-deposited layer instead of aluminum.

It is also possible to perform adhesion using a non-solvent type adhesive, instead of dry lamination.

Furthermore, as the high melting point biaxially stretched PET film, it is possible to utilize a film having printing on its front side.

(Potential Industrial Uses)

According to the present invention, it is possible to perform material recycling of the bags. At the same time, the resin layer does not absorb good flavor of the snacks, while flavor absorption has been a problem with polyolefin resin. In other words, by changing the material structure of the bags from a conventional composition [OPP (or PET)/vapor-deposited layer/different resin such as polyolefin] to a composition [PET/vapor-deposited layer/heat-sealable PET single resin] while providing the barrier property, material recycling becomes possible. Additionally, flavor adsorption is lessened.

More specifically, according to the present invention, material recycling is rendered possible by providing a structure of, from an inner side, [polyester-type low melting point sealant layer/vapor-deposited ceramic layer/polyester-type high melting point heat resistant layer], which uses identical compositions. Since the vapor-deposited ceramic layer is very thin, it does not obstruct the material recycling. Additionally, the printing is performed on the surface using ink such as DAIECORO, a product of Dainichiseika Color & Chemicals Mfg. Co., Ltd. that peels off during the material recycling process. Therefore, the ink can be removed during the recycling process.

According to the present invention, since polyester-type sealant is utilized as the innermost layer, little flavor adsorption occurs within the bag. Accordingly, it is possible to maintain the flavor of just-made snacks after the snacks are packaged.

Furthermore, according to the present invention, the total thickness is as thin as 23–70 μm. Additionally, by making the ratio of the thickness of the sealant to the total thickness not smaller than 0.30, it is possible to prevent creation of pinholes at the time of fin seal in pillow packaging.

What is claimed is:

1. A bag for packaging foods comprising:
    a heat-sealed laminated film consisting essentially of:
        polyester-type low melting point sealant layer;
        a barrier layer having barrier properties against oxygen and water vapor; and
        a polyester-type high melting point heat resistant layer, said polyester-type low melting point sealant layer forms an inner side of said bag.

2. The bag for packaging foods as set forth in claim 1, wherein
    said barrier layer is a vapor-deposited layer of ceramic or metal.

3. The bag for packaging foods as set forth in claim 2, wherein
    a polyester of said polyester-type low melting point sealant layer has a melting point not higher than 160° C; and
    a polyester of said polyester-type high melting point heat resistant layer has a melting point not lower than 220° C.

4. The bag for packaging foods as set forth in claim 3, wherein
    said polyester-type low melting point sealant layer is a resin layer in which said polyester is in a non-orientated state; and
    said polyester-type high melting point heat resistant layer is formed of a biaxially stretched film.

5. The bag for packaging foods as set forth in claim 2, wherein
    said polyester-type low melting point sealant layer is a resin layer in which said polyester is in a non-orientated state; and
    said polyester-type high melting point heat resistant layer is formed of a biaxially stretched film.

6. The bag for packaging foods as set forth in claim 2, wherein
    said vapor-deposited layer of ceramic or metal is a single element vapor-deposited layer of at least one component selected from a group consisting of $SiO_x$, $Al_2O_3$ and Al, or a two-element vapor-deposited layer of at least one two-element component selected from a group consisting of $SiO_x/Al_2O_3$, $SiO_x/ZnO$, $SiO_x/CaO$, $SiO_x/B_2O_3$, and $CaO/Ca(OH)_2$, a thickness of said vapor deposition being not greater than 1500 Å.

7. The bag for packaging foods as set forth in claim 6, wherein
    said polyester-type high melting point heat resistant layer is laminated with said polyester-type low melting point sealant layer after said vapor-deposited layer of ceramic or metal is formed on a surface of said polyester-type high melting point heat resistant layer.

8. The bag for packaging foods as set forth in claim 2, wherein
    a thickness of said polyester-type low melting point sealant layer is 15–50 μm;
    a thickness of said vapor-deposited layer of ceramic or metal is 300–1500 Å; and
    a thickness of said polyester-type high melting point heat resistant layer is 8–20 μm.

9. The bag for packaging foods as set forth in claim 2, further comprising a print layer.

10. The bag for packaging foods as set forth in claim 9, wherein
    said print layer is formed on a side of said polyester-type high melting point heat resistant layer that contacts said vapor-deposited layer of ceramic or metal, or on its opposite side.

11. The bag for packaging foods as set forth in claim 2, wherein
    said polyester-type low melting point sealant layer is formed of a laminate of a low melting point polyester resin and a high melting point polyester resin.

12. The bag for packaging foods as set forth in claim 11, wherein
    a polyester of said low melting point polyester resin is a polyester that is identical with or different from a polyester of said high melting point polyester resin.

13. The bag for packaging foods as set forth in claim 11, wherein
    a thickness of said low melting point polyester resin is 5–25 μm;
    a thickness of said high melting point polyester resin is 10–45 μm; and
    a thickness of said polyester-type low melting point sealant layer is 15–50 μm.

14. The bag for packaging foods as set forth in claim 11, wherein
    said polyester of said high melting point polyester resin is structured from collected polyesters.

15. The bag for packaging foods as set forth in claim 11, wherein
    said polyester-type high melting point heat resistant layer is laminated with said polyester-type low melting point sealant layer after said vapor-deposited layer of ceramic or metal is formed on a surface of said polyester-type low melting point sealant layer.

16. The bag for packaging foods as set forth in claim 1, further comprising an adhesive layer for adhering said layers that structure said bag.

17. The bag for packaging foods as set forth in claim 1, wherein the food products to be packaged are snacks.

18. The bag for packing foods as set forth in claim 1, wherein said bag is material-recyclable.

19. A method of packaging food products, comprising:
a back sealing process in which a laminated film that consists essentially of:
- a polyester-type low melting point sealant layer;
- a barrier layer having barrier properties against oxygen and water vapor; and
- a polyester-type high melting point heat resistant layer, is formed into a tubular shape such that said polyester-type low melting point sealant layer forms an inner side, and overlapping back portions are back sealed;

a food products inserting process in which food products are inserted into said tubular laminated film; and a side sealing process in which both ends of said back sealed laminated film are sealed.

20. A method of packaging food products as set forth in claim 19, wherein
the food products that are inserted into the tubular laminated film are snacks.

* * * * *

UNITED STATES PATENT AND TRADEMARK OFFICE
CERTIFICATE OF CORRECTION

PATENT NO.    : 6,543,208 B1
DATED         : April 22, 2003
INVENTOR(S)   : Yukio Kobayashi et al.

It is certified that error appears in the above-identified patent and that said Letters Patent is hereby corrected as shown below:

<u>Title page,</u>
Item [86], PCT.No.: "PCT/JP00/06210" should read -- PCT/JP00/06213 --.

Signed and Sealed this

Fifth Day of August, 2003

JAMES E. ROGAN
*Director of the United States Patent and Trademark Office*